United States Patent
Drouot

(10) Patent No.: US 9,177,406 B2
(45) Date of Patent: Nov. 3, 2015

(54) IMAGE MOSAICING UTILIZING MOTION OF SCENE CONTENT BETWEEN SUCCESSIVE IMAGES

(75) Inventor: Antoine Drouot, Paris (FR)

(73) Assignee: ST-ERICSSON SA, Plan-les-Ouates (CH)

(*) Notice: Subject to any disclaimer, the term of this patent is extended or adjusted under 35 U.S.C. 154(b) by 0 days.

(21) Appl. No.: 14/234,415

(22) PCT Filed: Jul. 31, 2012

(86) PCT No.: PCT/EP2012/064960
§ 371 (c)(1),
(2), (4) Date: Jan. 23, 2014

(87) PCT Pub. No.: WO2013/020860
PCT Pub. Date: Feb. 14, 2013

(65) Prior Publication Data
US 2014/0152863 A1 Jun. 5, 2014

Related U.S. Application Data

(60) Provisional application No. 61/529,335, filed on Aug. 31, 2011.

(30) Foreign Application Priority Data

Aug. 5, 2011 (EP) .................................... 11306020

(51) Int. Cl.
| | |
|---|---|
| H04N 5/228 | (2006.01) |
| G06K 9/40 | (2006.01) |
| G06T 11/60 | (2006.01) |
| G06T 3/40 | (2006.01) |
| G06T 7/20 | (2006.01) |

(52) U.S. Cl.
CPC ............... *G06T 11/60* (2013.01); *G06T 3/4038* (2013.01); *G06T 7/2013* (2013.01); *G06T 2200/32* (2013.01); *G06T 2207/10016* (2013.01); *G06T 2207/20021* (2013.01)

(58) Field of Classification Search
CPC .................................................. G06T 2200/32
USPC .................. 348/222.1, 207.99; 382/274, 284
See application file for complete search history.

(56) References Cited

U.S. PATENT DOCUMENTS

| | | | |
|---|---|---|---|
| 2004/0057633 A1 | 3/2004 | Mai et al. | |
| 2008/0152258 A1* | 6/2008 | Tulkki | ............................ 382/284 |
| 2010/0020190 A1 | 1/2010 | Kawakatsu et al. | |
| 2011/0043604 A1* | 2/2011 | Peleg et al. | ..................... 348/36 |

FOREIGN PATENT DOCUMENTS

| | | |
|---|---|---|
| WO | 9834195 | 8/1998 |
| WO | 2007122584 A1 | 11/2007 |

OTHER PUBLICATIONS

Hsu et al. "Mosaics of video sequences with moving objects." Signal Processing Image Communication; XP004476840; Jan. 1, 2004; pp. 81-98; vol. 19, No. 1; Elsevier Science Publishers, Amersterdam, NL
Irani et al. "Mosaic Based Representations of Video Sequences and Their Applications." Proceedings of the Fifth International Conference on Computer Vision; Jun. 20-23, 1995; Cambridge, MA; pp. 605-611; published in Princeton, NJ.

* cited by examiner

*Primary Examiner* — Tuan Ho
*Assistant Examiner* — Selam Gebriel
(74) *Attorney, Agent, or Firm* — Coats & Bennett, PLLC

(57) ABSTRACT

It is provided a method implemented by an electronic device for image mosaicing. The method comprises providing a mosaic and an image, wherein the mosaic and the image each represent at least part of a scene. The method also comprises estimating a motion of blocks of the image, wherein the motion of a given block of a given image represents how the scene content of the given block has moved during a time interval before taking the given image. The method then comprises integrating part of the image to the mosaic according to the estimation. Such a method improves the way of performing image mosaicing.

10 Claims, 3 Drawing Sheets

IMAGE MOSAICING UTILIZING MOTION OF SCENE CONTENT BETWEEN SUCCESSIVE IMAGES

TECHNICAL FIELD

The invention relates to the field of digital image processing, and more particularly to a method, program and electronic device for image mosaicing.

BACKGROUND

Image mosaicing is the process of creating an output image, also called "mosaic", from smaller input images. An example of application of image mosaicing is for creating a panoramic image. An example of a way of providing the input images is by capturing a video. Thus, with such examples of image mosaicing, it is possible for a user to sweep a scene with a video camera for capturing a video of the swept scene. The image mosaicing may create a panorama of the swept scene from the successive images of the captured video.

Documents US 2004/057633 A1, WO 9834195 A1, WO 2007/122584 A1 and the publication entitled "Mosaic based representations of video sequences and their applications" (by Irani et al., dated 1995, published in the Proceedings of the Fifth International Conference on Computer Vision, Cambridge, Mass., Jun. 20-23, 1995) present examples of image mosaicing.

An issue with the prior art image mosaicing solutions known to the Applicant is that they do not deal well with moving objects in the scene being recorded. This can lead to several kinds of defects, the most common ones being "ghosts", where moving objects are partially blended with the background. Other defects that commonly occur due this issue are extended or cut objects/persons. These all result in a low quality of the final mosaic.

SUMMARY

The object of the present invention is to alleviate at least partly the above mentioned drawbacks. More particularly, the invention aims at improving the way of performing image mosaicing.

This object is achieved with a method implemented by an electronic device for image mosaicing. The method comprises providing a mosaic and an image, wherein the mosaic and the image each represent at least part of a scene. The method also comprises estimating a motion of blocks of the image, wherein the motion of a given block of a given image represents how the scene content of the given block (i.e. the scene content located in the given block) has moved during a time interval before taking the given image. The method then comprises integrating part of the image to the mosaic according to the estimation. In an example, it is considered that the scene content of the given block has moved during the time interval if said scene content has changed compared to how it was at the beginning of the time interval (e.g. in other words, if there has been changes in the scene content since a last time when part of an image was integrated to the mosaic).

This object is also achieved with a computer program comprising instructions for performing the method.

This object is also achieved with a data storage medium having recorded thereon the program.

This object is also achieved with an electronic device comprising a camera, at least one memory having recorded thereon the program and at least one processor for executing the program recorded on the memory. The device may be a mobile communication device.

The invention offers many advantages, including the following:

The method offers all the advantages of image mosaicing. Notably, the method allows an update of the mosaic by integrating the image to it, thereby obtaining a new mosaic which represents better the scene. The method thus makes it possible for creating a large image (the mosaic) with an electronic device of which camera is not arranged for capturing such large image in one caption.

The method integrates the image according to the estimation previously performed. This means that the result of the estimation is taken into account for deciding whether to add the image to the mosaic and/or for deciding how to add the image to the mosaic. The movement of the content of the scene is detected during the estimating, and the integrating is performed in view of this movement. The method thus allows a more refined integration, which results in a higher quality of the final mosaic.

Further features and advantages of the invention will appear from the following description of embodiments of the invention, given as non-limiting examples, with reference to the accompanying drawings listed hereunder.

DETAILED DESCRIPTION

The method may be performed based on a computer program comprising instructions for performing the method, e.g. by reading the instructions by a processor. The program may be executable on a programmable device. The application program may be implemented in a high-level procedural or object-oriented programming language, or in assembly or machine language if desired. In any case, the language may be a compiled or interpreted language. The program may be a full installation program, or an update program. In the latter case, the program is an update program that updates a programmable device, previously programmed for performing parts of the method, to a state wherein the device is suitable for performing the whole method.

The program may be recorded on a data storage medium. The data storage medium may be any memory adapted for recording computer instructions. The data storage medium may thus be any form of nonvolatile memory, including by way of example semiconductor memory devices, such as EPROM, EEPROM, and flash memory devices; magnetic disks such as internal hard disks and removable disks; magneto-optical disks; and CD-ROM disks.

A device suitable for performing the method may be an electronic device comprising hardware memory, including volatile and/or non volatile memory, and having recorded thereon the program. The memory may store any other information used by the method. For example, the memory may store information such as the mosaic as it stands before performing the method and the image. Also, the memory may store the estimated motion of blocks and the mosaic as it stands after integrating the image, as well as any other information used in examples of the method. The memory is accessible by at least one processor, e.g. a Central Processing Unit (CPU) of the device. The processor may execute the program and may thereby perform the method, without further programming of the device.

In an example, the device may further comprise a camera. In such a case, the device may capture the image. The camera may be a video camera. In such a case, the image may be one of the images forming the video. The device may further comprise a display unit, such as a screen, for example for displaying a representation of the mosaic and/or image.

The device may be a communication device. The device may thus comprise a signal emitter and a signal receiver. For example, the device may be a telephone. The device may be a wireless communication device. The device may be mobile (i.e. transportable). The device may for example be a mobile phone (e.g. a cell phone).

Figure 1:
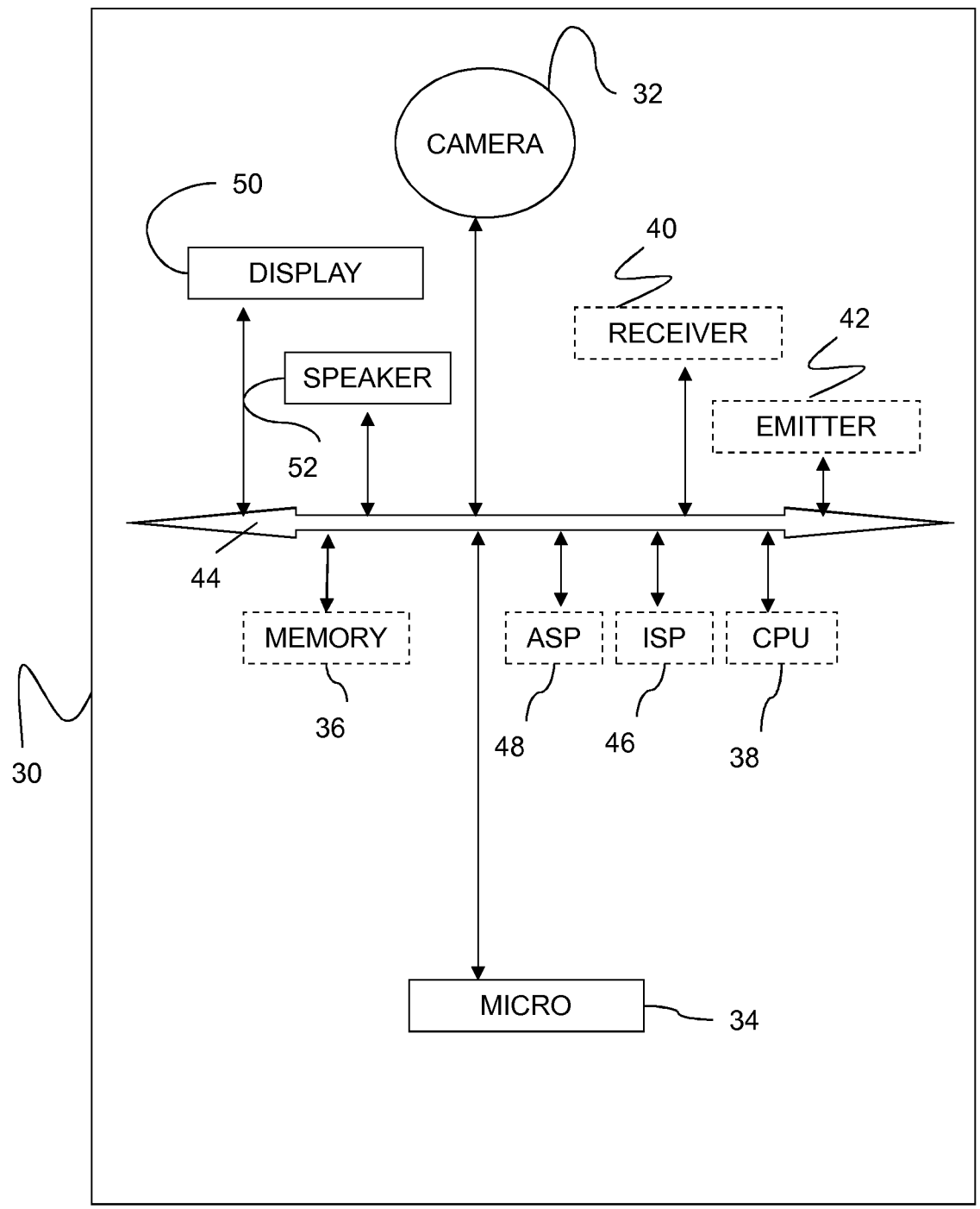
FIG. 1 shows a schematic representation of an example of an electronic device suitable for performing the method for image mosaicing.

It is referred to FIG. 1 which shows a block diagram representing an example of a mobile electronic device 30, which may be a mobile phone, suitable for implementing the method.

In the example, device 30 may be used for capturing audio and image data. For this, device 30 comprises camera 32 and microphone 34 for respectively capturing image and audio data. Device 30 also comprises memory 36 which may comprise volatile and non-volatile memory (not distinguished on the figure). Memory 36 may be divided in several compartments, possibly physically apart in device 30. Memory 36 stores, recorded thereon, instructions for performing the method, possibly already compiled or pre-compiled. Memory 36 also stores, in a volatile or non-volatile way, any captured image and audio data, and any other information used when using device 30 e.g. for performing the method. Device 30 also comprises processors including CPU 38, Image Signal Processor 46 (ISP) and Audio Signal Processor 48 (ASP). These processors accomplish the steps of the method by accessing data through bus 44, by processing the data or by circulating the data through the bus 44. Of course, fewer than three processors may physically be embodied, e.g. if one processor accomplishes all computations. On the other hand, more than three processors may physically be embodied, e.g. in the case of parallel processing. Device 30 also comprises display 50 and speaker 52 for outputting data, i.e. for respectively displaying image data and playing audio data. Device 30 also comprises receiver 40 and emitter 42, which are for communicating with the exterior e.g. with other devices, e.g. if device 30 is a cellular phone.

Figure 2:
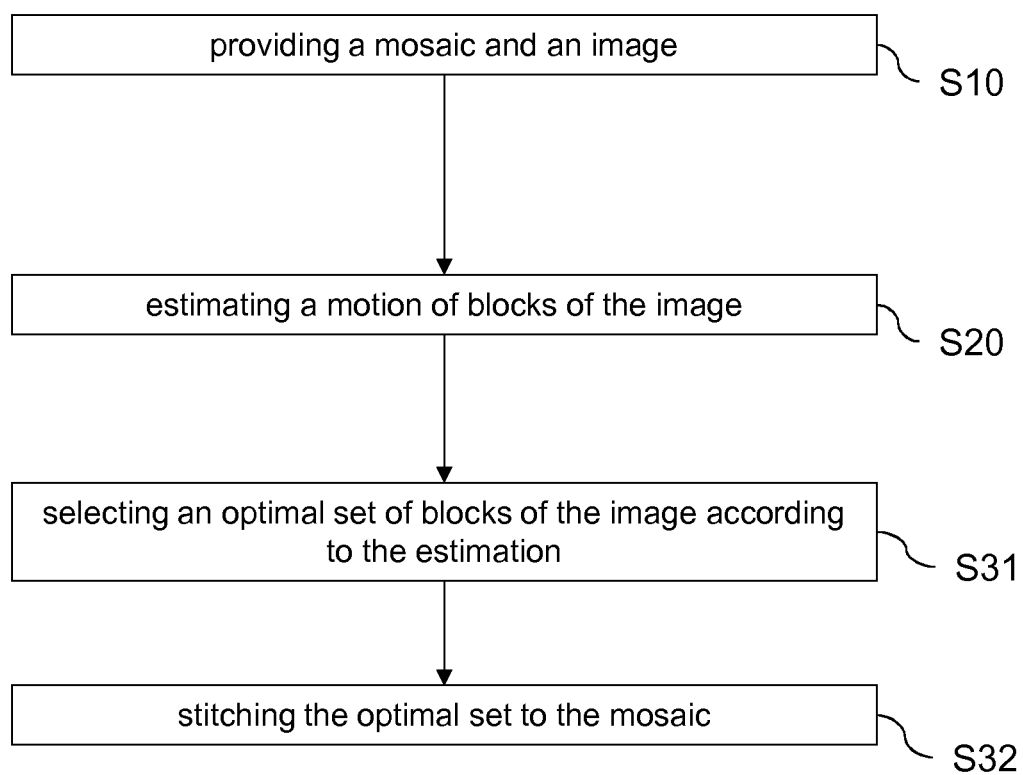
FIG. 2 shows a flowchart of an example of the method for image mosaicing.

It is referred to FIG. 2 which shows a flowchart of an example of the method for image mosaicing, which may be performed by any suitable electronic device.

The method of the example comprises providing (S10) a mosaic and an image (to be integrated to the mosaic). Providing (S10) the mosaic and the image means to render accessible the mosaic and the image to the electronic device. This means that the mosaic and the image are present on a memory of the device. For example, the method may comprise sending the mosaic and/or the image to the device as such. The method may alternatively comprise capturing the image and/or previously constituting the mosaic. By providing (S10) the mosaic and the image to the device, the electronic device may process the mosaic and/or the image according to the subsequent steps of the method.

Generally speaking, a mosaic is merely an image and the method is about integrating a first image (referred to as "image" or "image to be integrated") to a second image (referred to as "mosaic"). The method is for image mosaicing. In other words, the method is for assembling several images that represent parts of a scene (i.e. a zone to be represented). The resulting assembly (i.e. the mosaic) represents a larger part of the scene than individual images. At a given point of image mosaicing, the mosaic represents the current state of the assembly. The mosaic may thus represent a part of the scene larger than could possibly be captured by the device at once, e.g. by taking a picture with its camera if the device has a camera.

The method of the example also comprises estimating (S20) a motion of blocks of the image to be integrated. By "block" it is meant a part of the image. The method may thus comprise dividing the image to be integrated into blocks and estimating (S20), for several or all of the blocks, a value of the motion. For a given image, the "motion" of a given block represents how the scene content of the given block has moved during a time interval before taking the given image, e.g. in absolute value and optionally in direction. The motion of a block thus represents the movement of the contents of the scene, i.e. the elements of the scene ((e.g. object(s) and/or person(s)), that are present in the block when taking the image to be integrated during the time interval. The time interval may be set arbitrarily. The image may come from a video, wherein a video designates a time series of images. In such a case, the time interval may be the interval between the image to be integrated and the previous image in the video (e.g. which previously was to be integrated to the mosaic e.g. by a previous iteration of the method). Estimating (S20) the motion of blocks may be performed according to any classic motion estimation technique.

The method of the example then comprises integrating (S31, S32) part of the image to the mosaic according to the estimation (S20). In other words, the method takes into account the result of the estimation (S20) for the integrating (S31, S32). This allows a refined image mosaicing and results in a higher quality of the image, more meaningful to the user and dealing with moving content.

In the case of the example, the integrating (S31, S32) comprises selecting (S31) an optimal set of blocks of the image, according to the estimation (S20), and stitching (S32) the optimal set to the mosaic. Stitching (S32) the optimal set of blocks amounts to image stitching and may be performed to any classic image stitching technique. The stitching (S32) may notably include a blending in case there is an overlap between the optimal set and the mosaic, or a simple appending in case there is no such overlap. As the selecting (S31) is performed according to the estimation (S20), the method stitches (S32) the most relevant part of the image (i.e. the "optimal set of blocks"), as regards to the motion of its blocks. The optimal set of blocks may for example be provided as the optimal location for which an ulterior stitching will be the most seamless.

The selected optimal set may be null (i.e. void). In such a case, the stitching (S32) amounts to leaving the mosaic as it is. For example, if all the blocks of the image have scene content that is moving, the decision may be to integrate nothing at all. The selected optimal set may be a non null part of the image, possibly the whole image. In such a case, the mosaic is modified (in the following, the modified mosaic is may still be called "the mosaic" for the sake of convenience). Alternatively, the optimal set may be selected amongst non null sets of blocks. For example, if the optimal set is provided as an optimal location, i.e. for which ulterior stitching will be the most seamless, the method may return a non-null optimal set in any case. In all cases, the method relies on the information provided by the estimation (S20) for processing the image relative to the mosaic.

An example of the method is now discussed. In this example, the method comprises providing a plurality of images and iterating the providing (S10), the estimating (S20) and the integrating over the plurality of images. The integrating may be as in the example of FIG. 2, i.e. comprising the selecting (S31) and the stitching (S32). The plurality of images is noted $(I_0, I_1, \ldots, I_k, \ldots)$ for the sake of convenience. Providing the plurality of images $(I_0, I_1, \ldots, I_k, \ldots)$ may comprise capturing a video. The images of the plurality $(I_0, I_1, \ldots, I_k, \ldots)$ may be the sequential images of the video, and the iteration may follow the sequence. The method of this example is particularly convenient, because it allows the production of a mosaic of high quality from a video, dealing with movement of scene content. The movement of scene content is particularly an issue when image mosaicing from video, because images of a video are close to each other in time and position. The method alleviates at least partly this issue.

The case where the plurality of images $(I_0, I_1, \ldots, I_k, \ldots)$ comes from a video is now contemplated. In this case, the method may be iterated dynamically as the video is being captured. In other words, this example of the method creates the mosaic as the video is captured. For example, if the device is a mobile portable device, the mosaic image may be created while capturing a video. This makes the device convenient for taking large panoramas or large images with high quality even in case there is movement in the scene.

The iterating is now explained in more details. First of all, the mosaic $M_{-1}$ is set to null. The device captures the video and the method provides (S10) image $I_0$ and the null mosaic $M_{-1}$. The method then comprises the estimation (S20) performed on $I_0$ and the integrating of $I_0$ to $M_{-1}$, for example as explained with reference to FIG. 2. The mosaic that results is noted $M_0$. In this case, $M_0$ may be set to $I_0$, i.e. the whole image $I_0$ is selected (S31) and stitched (S32) to the mosaic. At this point, a first iteration of the method has been performed. A second iteration may then take place. For this second iteration, the method provides (S10) image $I_1$ and $M_0$. The method estimates (S20) motions of blocks of $I_1$ and accordingly integrates $I_1$ to the mosaic, now noted $M_1$. The iterations may continue this way over the plurality $(I_0, I_1, \ldots, I_k, \ldots)$, while the plurality is incremented e.g. as a user captures a video. Of course, all images of such plurality need to be stored in memory. It is sufficient for the method to have only the current image (the one to be integrated) and the previous image (the image previous to the current image, so as to easily estimate the motion of blocks of the current image). For each new frame (i.e. image) that provided, the oldest one may thus be discarded.

An example of how to estimate (S20) a motion $V_{ij}^k$ of blocks $B_{ij}^k$ of image $I_k$, is now described.

The plurality of input images $(I_0, I_1, \ldots, I_k, \ldots)$(video frames in this case) may be placed in a common reference. This may be performed by advanced techniques such as feature matching and/or image warping. This may also be done by low cost methods suited to embedded devices. Indeed the alignment may be performed by classic motion estimation (e.g. block based matching). For an image $I_k$, the output of this estimation is typically one motion vector per block. From this vector field one global motion vector $GMV^k$ may be extracted, e.g. as the median of the vector field, allowing to position the input image in the mosaic. The method may be performed with different motion models, such as a translation GMV, or more complex motions such as a rotation, an affine motion or a perspective motion.

Then, new image content may be blended into the mosaic. In classical methods, such as patent WO2007/122584, the position in the frame of the part of the input image that is added into the mosaic is always the same. It is generally the center of the frame. As a result, if there are objects that are moving along this location, or crossing it, these objects will be either compressed, partially rendered (local motion crossing the blending zone), or extended, multiply rendered (local motion following the blending zone). The method alleviates this issue.

In the example of the method, once the $GMV^k$ has been extracted from the motion vector field as explained above, the method may compute for each block $B_{ij}^k$ of the input image $I_k$ the absolute difference between the global motion vector and the local motion vector. In an implementation, this may be done by computing the differences in X and Y, and taking the maximum one. For the block $B_{ij}^k$ at line i and column j, which has a motion vector $MV_{ij}^k = (MV_{ij}^k,x, MV_{ij}^k,y)$, we have:

$$V_{ij}^k, x = |MV_{ij}^k, x - GMV^k, x|,$$

$$V_{ij}^k, y = |MV_{ij}^k, y - GMV^k, y|, \text{and}$$

$$V_{ij}^k = \text{MAX}(V_{ij}^k, x; V_{ij}^k, y).$$

The magnitude of this difference may be considered as representative of the probability that this block contains local motion differing significantly from the global motion. For instance, in an implementation, blocks may be divided in four different categories, each categories being associated to a probability $P_{i,j}$, defined by 3 thresholds V1, V2 and V3 such that V1<V2<V3.

In an implementation:
If $V_{ij}^k$>V3, then $P_{ij}$=4;
Else if $V_{ij}^k$>V2 then $P_{ij}$=2;
Else if $V_{ij}^k$>V1 then $P_{ij}$=1;
Else $P_{ij}$=0.
With V1=1 pixel, V2=2 pixels, V3=4 pixels.

An example of the selecting (S31) is now discussed. In this example, the method comprises the selecting (S31) of an optimal set $C_j^k$ of blocks $B_{ij}^k$ of the image wherein the optimal set $C_j^k$ is a set of blocks of the image $I_k$ that minimizes a predetermined cost function F. The way to minimize the cost function may be performed according to any classical optimization algorithm. The cost function may reflect different constraints. The cost function F takes as argument one set of blocks of an image (i.e. the cost function is a function of sets of blocks of images). The cost function may increasingly depend on different constraints of which values are determined by the argument set of blocks. By "increasingly depend", it is meant that the cost function F is a monotonic (increasing) function of a constraint with other things the same (ceteris paribus), i.e. other constraint kept constant. This is classical when optimizing several constraints.

The stitching (S32) may depend on an orientation of the mosaic (for example horizontal or vertical if the mosaic is a panorama). An example of selecting (S31) and stitching (S32) will now be explained for the case where the mosaic is a horizontal panorama. This example is directly applicable for the vertical case by changing columns by lines.

At an iteration k, the stitching (S32) may append to current mosaic $M_{k-1}$ a vertical strip $C_j^k$ of the new image $I_k$, and may further perform a blending to the left (or right, depending on the direction) of this strip. In the prior art, the strip is usually taken systematically at the exact center of the image. On the contrary, the method selects a refined location for the strip to be stitched in the panorama, mainly by taking care that little local motion is present close to it. The abscissa for stitching may be obtained by minimizing the cost function F that may express different constraints.

In the example, F depends on a cumulated motion of the argument set. The cumulated motion of a given set of blocks of a given image is any value that represents how the scene content of the given image at the level of the given set of blocks has moved during a time interval before taking the given image. The idea is that there should better be as little local motion as possible around the stitching area.

The cumulated motion may simply be the sum of the motion $V_{ij}^k$ of (all) the blocks $B_{ij}^k$ of the argument set. The $P_{i,j}$ may be summed on each column, giving a probability of local motion for each column $S_j=C_{0,j}+C_{1,j}+ \ldots +C_{bl\_h-1,j}$, bl_h being the number of blocks in the input image, in the vertical dimension. This sum could directly be used in the cost function.

For a refined cost function, the cumulated motion may be a weighted sum of the motion of the blocks of the image $I_k$. The weight for a given block may decreasingly depend on a distance between the given block and the argument set. The weighted sum is a filtered version of the above sum. This incorporates information from the whole image. In this way, the decision of the best abscissa is global, which improves the robustness of the algorithm. An additional benefit is that inaccuracies in the detection of local motion are smoothed out.

The filtered signal $S'_j$ (i.e. the weighted cumulated sum) may be defined by:

$$S'_j = \sum_{k=[0 \ldots bl\_w-1]} W(|j-k|) \times S_k$$

W(x) may be a decreasing weighting function, for instance 1/(x+1), and bl_w the number of blocks in the input image, in the horizontal dimension.

The cost function F may further increasingly depends on a distance between the argument set and a central zone of the image $I_k$. This improves the quality of the image. The stitching area should better be relatively close to the center of the image, to maximize image quality, and provide similar results for cases where there is no local motion.

To express this constraint, any increasing function $f(x)$ applied to |j−bl_w/2| is sufficient. $f(x)=x$ is a convenient one, due to its simplicity. It may be interesting, however, to be more subtle. Indeed, all stitching positions may not have the same contribution to the cost function, as positions around the center of the frame are more or less equivalent, and positions very near the left and right borders of the frame are severely degraded in quality, and should therefore only be selected in extreme cases. One function that expresses well this constraint is the sigmoid function $f(x)=1/(1+e^{-\lambda x})$, due to its S-shape. By using this function, positions close around the center of the frame have very similar cost, while this cost rapidly rises for positions too far from the center. Thus the contribution to the cost function of this constraint can be expressed by: $S''_j=A/(1+e^{\alpha-\beta \times |j-bl\_w/2|})$, with A, α, and β being constants.

The cost function F may further increasingly depend on a difference between a position of the argument set and a position of a previously selected argument set. By previously selected argument set, it is meant the optimal set selected in a previous iteration of the method.

Indeed, a potential additional, less critical constraint may be about the temporal stability of the stitching area. It is better to limit its variation from frame to frame, and this is also included in the cost function. The constraint has no strong requirement, and any increasing function $f(x)$ may be used. A simple one, $f(x)=x$, may be used, so that the contribution to the cost function is:

$S'''_j=|j-J_{prev}|$, where $J_{prev}$ is i the best stitching position that was chosen at the previous frame.

The resulting cost function (taking into account the constraints detailed earlier) may simply be a linear combination of the three constraints:

$$F(j)=a \times S'_j+b \times S''_j+c \times S'''_j,$$

a, b and c are constants that may be obtained through experimentation and/or simulation.

The block index J that minimizes F is the chosen abscissa for stitching. In the rare case where several indexes satisfy this condition, then the closest one to the center of the frame may be chosen.

This method allows a very strong reduction of the ill effects that happen in the case of local motion during panorama shooting, without adding significant new processing or memory requirement to the panorama from video use case. Indeed, algorithms dealing with local motion may require that all frames used for the panorama building are kept into memory, and a complex decision procedure may be used to select which picture to use for each pixel of the panorama, which is both complex and requires a high amount of memory.

Figure 3:
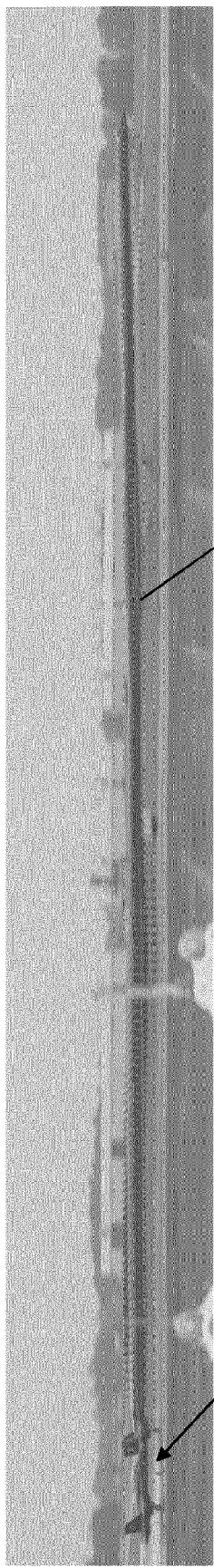
FIG. 3 shows an example of a mosaic produced in the prior art.
Figure 4:
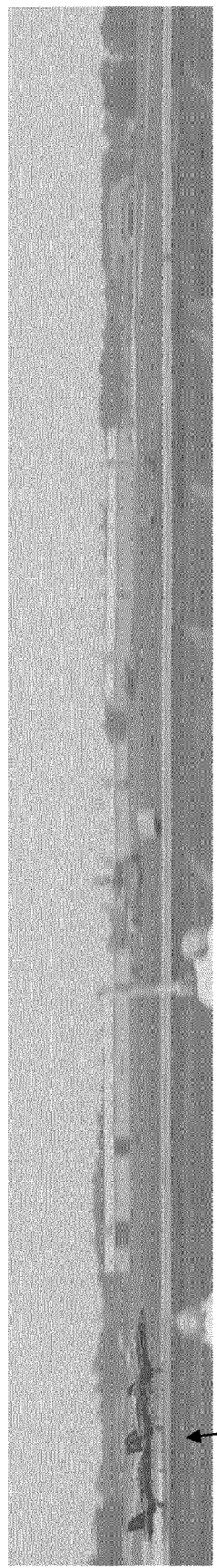
FIG. 4 shows an example of a mosaic produced by the method.
Figure 5:
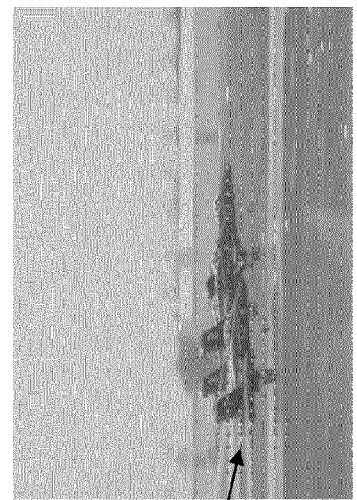
FIG. 5 shows a frame integrated to the mosaic of FIG. 4.

An example of what the proposed invention can achieve is shown with reference to FIGS. 3-5. A group of three jets 70 were filmed while they were taking off. The panoramic mosaic of FIG. 3 was produced with a prior art method (i.e. always stitching the central column of the frames of the video). The panoramic mosaic of FIG. 4 was produced with the method of FIG. 2, wherein the providing, the estimating and the integrating were iterated on the frames of the video, and wherein the cost function was of the type $F(j)=a \times S'_j+b \times S''_j+c \times S'''_j$. As can be seen from FIG. 3, the panorama of the prior art resulted in a blur 60 due to one of the jets taking off while the scene was swept by the user. On the contrary, the method used for FIG. 4 resulted in a high quality panorama, wherein the moving objects (i.e. the jets) are dealt with.

FIG. 5 illustrates the classification of local motion that has been previously described for one of the frames of the captured video. The vectors that are represented by vertices 80 are those with a probability of being local motion greater than 0 (i.e. the blocks to which they correspond have a probability higher than 0 of having moving content). As can be seen, the blocks corresponding to the moving jet have a non-zero motion value. The best location for stitching is thus chosen on the right side, well ahead of the jets, thus avoiding blending them in the panorama, and leading to the high quality of the panorama of FIG. 4.

The invention claimed is:

1. A method, performed by one or more processing circuits, of image mosaicing to create an output mosaic comprising a plurality of smaller images, wherein the method comprises:
   providing a mosaic and an image, wherein the mosaic and the image each represent at least part of a scene;
   estimating, by the processing circuits, a motion of blocks of the image, wherein the motion of a given block of a given image represents how the scene content of the given block has moved during a time interval before taking the given image; and
   integrating part of the image to the mosaic according to the estimation by selecting an optimal set of blocks of the image, wherein the optimal set is a set of blocks of the image that minimizes a predetermined cost function, wherein the cost function takes as argument one set of blocks of an image and increasingly depends on a cumulated motion of the argument set, wherein the cumulated motion of a given set of blocks of a given image represents how the scene content of the given image at the level of the given set of blocks has moved during a time interval before taking the given image, and stitching the optimal set to the mosaic.

2. The method of claim 1, wherein the cost function further increasingly depends on a distance between the argument set and a central zone of the image.

3. The method of claim 1, wherein the cumulated motion is the sum of the motion of the blocks of the argument set.

4. The method of claim 1, wherein the cumulated motion is a weighted sum of the motion of the blocks of the image, wherein the weight of a given block decreasingly depends on a distance between the given block and the argument set.

5. The method of claim 1, wherein the cost function further increasingly depends on a difference between a position of the argument set and a position of a previously selected argument set.

6. The method of claim 1, further comprising providing a plurality of images and iterating the steps of providing, estimating and integrating over the plurality of images.

7. The method of claim 6, wherein providing the plurality of images comprises capturing a video.

8. A non-transitory, machine-readable medium containing program instructions for image mosaicing to create an output mosaic comprising a plurality of smaller images, wherein the program instructions are operative to cause one or more processing circuits to:
   access a mosaic and an image, wherein the mosaic and the image each represent at least part of a scene;
   estimate a motion of blocks of the image, wherein the motion of a given block of a given image represents how the scene content of the given block has moved during a time interval before taking the given image; and
   integrate part of the image to the mosaic according to the estimation by selecting an optimal set of blocks of the image, wherein the optimal set is a set of blocks of the image that minimizes a predetermined cost function, wherein the cost function takes as argument one set of blocks of an image and increasingly depends on a cumulated motion of the argument set, wherein the cumulated motion of a given set of blocks of a given image represents how the scene content of the given image at the level of the given set of blocks has moved during a time interval before taking the given image, and stitching the optimal set to the mosaic.

9. An electronic device comprising:
a camera;
memory; and
one or more processing circuits operatively connected to the memory, the processing circuits operative to
   access a mosaic and an image, wherein the mosaic and the image each represent at least part of a scene;
   estimate a motion of blocks of the image, wherein the motion of a given block of a given image represents how the scene content of the given block has moved during a time interval before taking the given image; and
   integrate part of the image to the mosaic according to the estimation by selecting an optimal set of blocks of the image, wherein the optimal set is a set of blocks of the image that minimizes a predetermined cost function, wherein the cost function takes as argument one set of blocks of an image and increasingly depends on a cumulated motion of the argument set, wherein the cumulated motion of a given set of blocks of a given image represents how the scene content of the given image at the level of the given set of blocks has moved during a time interval before taking the given image, and stitching the optimal set to the mosaic.

10. The device of claim 9, wherein the electronic device is a mobile communication device.

* * * * *